March 31, 1970   H. A. RIESTER ET AL   3,503,261
RESISTANCE TO CURRENT CONVERTER
Filed Nov. 1, 1967

Fig. 1.
PRIOR ART
SENSING RESISTOR FIELD — INSTRUMENT ROOM

Fig. 2.
TWO-WIRE ΔR/I SYSTEM
FIELD — INSTRUMENT ROOM

Fig. 3.
BALANCING RESISTOR 21
REGULATOR   TWO WIRE LINE
SENSING RESISTOR
BRIDGE
D-C AMP.
FEEDBACK
LOAD

Fig. 4.
$V_s$ : SUPPLY VOLTAGE
$V_f$ : FEEDBACK VOLTAGE
$I_o$ : OUPUT CURRENT
$I_1$ : BRANCH CURRENT
$R_1, R_2$: FIXED RESISTANCE
$R_t$ : BULB RESISTANCE
$R_{to}$: FIXED RESISTANCE
$R_f$ : FEEDBACK RESISTANCE

COMMON

INVENTORS
HUBERT A. RIESTER
TAMOTSU KOBAYASHI
BY
ATTORNEY

_United States Patent Office_

3,503,261
Patented Mar. 31, 1970

3,503,261
RESISTANCE TO CURRENT CONVERTER
Hubert A. Riester, Huntingdon Valley, and Tamotsu Kobayashi, Hatboro, Pa., assignors to Fischer & Porter Co., Warminster, Pa., a corporation of Pennsylvania
Filed Nov. 1, 1967, Ser. No. 679,890
Int. Cl. G01k 7/24; G08c 19/04; H04b 3/50
U.S. Cl. 73—362                                                6 Claims

ABSTRACT OF THE DISCLOSURE

A resistance-to-current converter which derives its operating power from the same two-wire line used to convey the output current to a remote indicator, the converter acting in conjunction with a sensing resistor responsive to a physical condition and included in a bridge circuit. The output voltage of the bridge circuit is fed into the input of a differential amplifier in series opposition with a feedback voltage derived from the output thereof to minimize the effect of bridge non-linearity. The output of the amplifier, in which functions effectively as a variable impedance, is connected through a voltage regulator and an extended two-wire line to a D-C power source connected in series with the indicator, the regulator acting to stabilize the operating voltage of the amplifier despite variations in output current resulting from variations in the value of the sensing resistor.

---

The invention relates generally to resistance-to-current converters for converting a resistance change to an output current proportional thereto, and more particularly to a device of this type which is adapted to derive its operating power from the same lines used to convey the output current to a remote load.

In process control systems, certain process variables are converted into equivalent electrical current values which are conveyed to a read-out device or which serve to control the operation of a final control element governing the process variable. It is known to detect changes in a process variable in terms of varying resistance. Thus fluctuations in temperature may be sensed by resistance bulbs or thermistors whose ohmic value reflects the temperature prevailing in a process pipe line or tank. A change in liquid level may be detected by a float mechanically linked to a slider on a potentiometer whereby the resultant resistance is proportional to the existing liquid level.

This change in resistance as a function of a process change is then transduced into a current signal by means of a resistance-to-current converter. Such converters generally take the form of an A-C line powered amplifier responsive to a change of voltage produced by the change in resistance and functioning as a variable impedance to effect a corresponding change in output current flow.

In many instances, the converter is field-mounted. That is, the sensing resistor and the amplifier associated therewith are located in the area of the process pipe or other source of a process variable to be sensed. In this event, it is necessary to supply an A-C operating voltage from the remote instrument room to the amplifier by way of a power line having a pair of wires, the output current being conveyed from the amplifier to the load at the instrument room by another pair of wires. Hence with this arrangement, four wires are entailed. With extended distances between the field installation and the instrument room, a four-wire connection therebetween adds substantially to the costs involved. Moreover, the existence of an extended high-voltage power line may be dangerous should the line pass through an atmosphere containing hazardous gases.

Alternatively, the resistance-to-current converter may be located at the instrument room, in which event three lines are ordinarily necessary to couple the sensing resistor circuit to the input of the amplifier. While this advantageously reduces the wire requirements, it has drawbacks in that the coupling between the resistor circuit and the amplifier may be over-extended and give rise to inefficient operation and possibly noise pickup.

In view of the foregoing, it is the main object of this invention to provide a resistance-to-current converter system wherein the converter includes a D-C amplifier and derives its D-C operating power from a two-wire line which also serves to convey the output current signal to a remote load, thereby effecting significant economies in installation costs.

A significant aspect of the invention is that despite the use of a two-wire line to convey both the operating power and output signal, the output signal is independent of supply voltage or line resistance effects. Another advantage of the invention is security against hazardous atmospheres, for there is no high-voltage A-C power line involved, and low-voltage D-C energy from the power supply can be limited by a protective device to make the instrument intrinsically safe.

More specifically, it is an object of the invention to provide a converter in which the sensing resistor is included in a bridge whose output is coupled to a D-C amplifier powered by a single D-C source, the current to and from the amplifier being proportional to the unbalance of the bridge.

It is also an object of this invention to provide a resistance-to-current converter of the above type which includes a negative feedback arrangement in conjunction with the amplifier to minimize non-linearity in the output signal versus the sensing resistance, thereby making it possible to use linear chart scales on the read-out devices and to effect significant savings in calibration and engineering costs.

Briefly stated, these objects are attained by a resistance-to-current converter system wherein the sensing resistor responsive to the process variable is included as an arm in a bridge circuit coupled to the input of a differential D-C amplifier, a feedback voltage derived from the output of the amplifier being applied to the input thereof in series-opposition with the bridge voltage to minimize the effect of bridge non-linearity, the output of the amplifier, which functions effectively as a variable impedance, being connected through a voltage regulator and an extended two-wire line to a D-C power source connected in series with the load, the regulator acting to stabilize the operating voltage of the amplifier despite variations in output current resulting from variations in the value of the sensing resistor.

For a better understanding of the invention, as well as other objects and further features thereof, reference is made to the following detailed description to be read in conjunction with the accompanying drawing, wherein:

FIG. 1 is a block diagram of a conventional resistance-to-current converter system using four wires for conveying the output current and the operating power;

FIG. 2 is a block diagram of a converter system in accordance with the invention, wherein only two wires serve to convey both power and signal;

FIG. 3 is a schematic diagram of the system shown in FIG. 2; and

FIG. 4 is the equivalent circuit to that shown in FIG. 3.

THE PRIOR ART

Referring now to FIG. 1, there is shown a conventional arrangement wherein a resistance-to-current converter 10 in the form of an A-C powered amplifier is connected to a sensing resistor 11. Resistor 11 may be any variable resistor whose ohmic value is a function of a process variable or other factor. Thus resistor 11 may be a resistance bulb or a thermistor disposed in a process line or tank and responsive to variations in the temperature of a fluid. Or it may be a potentiometer having a slider which is mechanically linked to a movable device to produce a change in resistance as a function of variations in position or other physical condition. The manner in which the resistance of the sensing resistor is caused to change, forms no part of the present invention. In the arrangement shown, both the resistor 11 and the converter coupled thereto are located in the field, whereas the readout device or load 12 is in an instrument room or other location remote from the field installation.

In order, therefore, to supply operating power to the converter, an A-C power line constituted by a pair of wires 13 and 14 is extended between the converter 10 and the instrument room. To convey the current signal to the load, a second pair of wires 15 and 16 is extended between the output of the converter and load 12. The disadvantages inherent in this arrangement have already been explained.

THE PRESENT CONVERTER SYSTEM

With the present invention, as shown in FIG. 2, the resistance-to-current converter 17 is also located in the field. However, it incudes a direct-current amplifier which is powered from a battery 18 or other direct-current source located at the instrument room or other site remote from the amplifier, the battery being connected in series with load 12 to the converter 17 by way of only two wires 19 and 20. These two wires serve to conduct operating power to the converter and also to convey the signal current to the load in a manner whereby the signal current is independent of supply voltage or line resistance effects.

Referring now to FIG. 3, there is shown the circuit of the converter system in accordance with the invention. It will be seen that sensing resistor 11 forms an arm in one branch of a bridge circuit which further includes a balance-adjusting resistor 21, the other branch being formed by fixed resistors 22 and 23. A and B are the ouput junctions or diagonals, and C and D, the input junctions or diagonals of the bridge.

A voltage is applied across input diagonals C and D through a series resistor, the voltage supplied to the bridge being stabilized by Zener diode 24 so that the ouput signal current produced by the converter is unaffected by changes in the power supply voltage. Balancing resistor 21 is adjusted to effect bridge balance for a predetermined value of sensing resistor 11, so that no output voltage is developed across output diagonals A and B unless sensing resistor deviates from said predetermined value, the bridge output voltage having a magnitude and polarity which depends on the extent and direction of said deviation.

Bridge output diagonals A and B are connected to the input of a low-drift differential D-C amplifier 25 which effectively functions as a variable impedance whose value is controlled by the voltage difference between bridge diagonals A and B. Accuracy of voltage-to-current conversion is not necessary, because of the corrective action produced by the feedback technique to be later described.

The positive side of battery 18 is connected through a transistor 26 acting as a voltage regulator, to the positive output terminal of amplifier 25. A reference voltage for the regulator is established by Zener diode 27 connected between the base of transistor 26 and the negative output terminal of amplifier 25, which terminal is connected through a feedback span potentiometer 28, the line wire 20, and load 12, to the negative side of battery 18.

Thus in operation, if the resistance of sensing resistor 11 increases, diagonal B becomes positive with respect to diagonal A, thereby reducing the amplifier impedance. This reduction in impedance causes an increase in output signal current flow which passes through both load 12 and feedback potentiometer 28. As a consequence, the swinger or slider of potentiometer 28 becomes more negative with respect to input diagonal D and compensates for the potential rise taking place at output diagonal B due to an increase in the sensing resistance. Thus the feedback voltage is in series opposition with the voltage produced by the sensing resistor.

In summary, while the bridge output voltage changes the current consumption of the differential amplifier, the feedback voltage developed on the span resistor is added into one branch of the bridge to rebalance the bridge circuit. Thus the bridge current change due to bulb-resistance change is suppressed by the feedback voltage and the output is accurately proportional to the input resistance change.

OPERATING PARAMETERS

We shall now, in connection with FIG. 4, provide a mathematical analysis of the circuit behavior.

With temperature measurement using resistance bulbs, one problem encountered is the non-linearity of the output signal versus temperature. This non-linearity is constituted by two factors, one being the actual non-linearity of the sensing resistor versus temperature, and the other so-called bridge non-linearity. With certain types of resistance bulbs, these two effects can cancel to produce a linear output bridge signal with respect to temperature. This is characteristic of resistance bulbs wound of nickel wire. However, with platinum-wound resistance bulbs, these effects are additive.

With the feedback arrangement shown in FIG. 3, the non-linearity effect of the bridge is eliminated, and the only remaining non-linearity is that of the sensing resistor. Typical values at a temperature span of 0° C. to 100° C. is 0.37%, using a platinum 100-ohm bulb at 0° C. This means that linear charts and scales on the read-out device can be used, thereby effecting significant savings in calibration and engineering costs.

To explain how this is accomplished, we shall now refer to FIG. 4, wherein $Vs$ is the supply voltage, $Vf$ is the feedback voltage, $Io$ is the output current, $I_1$ is the branch current, $R_1$, $R_2$ are fixed resistances, $Rt$ is the bulb resistance, $Rto$ is a fixed resistance, and $Rf$ is the feedback resistance.

In the arrangement shown, the voltage $V_A$ developed at point A, is:

$$V_A = \frac{R_2 Vs}{R_1 + R_2} \quad \text{(Equation 1)}$$

The voltage $V_B$ developed at point B, is:

$$V_B = Vc - I_1 Rto \quad \text{(Equation 2)}$$

And the branch current is:

$$I_1 = \frac{Vs - Vf}{Rto + Rt} \quad \text{(Equation 3)}$$

Therefore, $$V_B = Vs - \left(\frac{Vs - Vf}{Rto + Rf}\right) \cdot Rto$$

If the gain of amplifier 25 is sufficiently high, input voltage $V_A - V_B$ can be very small to get a finite output current. Therefore, $$V_A \cong V_B, \text{ approximately} \quad \text{(Equation 4)}$$

From Equations 1, 2, 3 and 4, it will be seen that the feedback voltage $Vf$ is:

$$Vf = \frac{R_1 Rt - R_2 Rto}{Rto(R_1 + R_2)} \cdot Vs$$

and that the branch current $I_1$ is:

$$I_1 = \frac{R_1}{Rto(R_1 + R_2)} \cdot Vs$$

Therefore, the output current $Io$ is:

$$Io = \frac{Vf}{Rf} + I_1 = \frac{R_1(Rt+Rf) - R_2 Rto}{Rto(R_1+R_2)} \cdot \frac{Vs}{Rf}$$

(Equation 5)

That is, the output $Io$ is a linear function of input resistance $Rt$.

In summary, Equation 1 indicates that point A is a fixed signal, since $Vs$ and $R_1$ and $R_2$ are stable. However, point B is a variable signal as given by Equations 2 and 3 combined. Feedback voltage $Vf$ is essentially in series-opposition to the sensing resistor output, that is, $I_1 Rt$. Since the amplifier adjusts its output $Io$ so that $V_A = V_B$, Equations 1, 2, 3 and 4, are combined to produce Equation 5, so that $Io$ is dependent only upon the desired $Rt$ variations, with all other terms fixed.

While there has been shown and described a preferred embodiment of resistance-to-current converter in accordance with the invention, it will be appreciated that many changes and modifications may be made therein without, however, departing from the essential spirit of the invention.

What we claim is:

1. A resistance-to-current converter system comprising:
   (a) a sensing resistor responsive to a variable physical condition to be indicated,
   (b) a bridge including said resistor, said bridge having input and output junctions and being balanced only when said resistor has a predetermined value, whereby the bridge voltage developed at said output junctions is a function of the deviation of the resistor from said predetermined value as a result of a change in said physical condition,
   (c) a D-C amplifier whose input circuit is connected to the output junctions of said bridge whereby the impedance in the output circuit of the amplifier varies as a function of said bridge voltage,
   (d) a direct-voltage source providing an operating voltage both for said bridge and said amplifier,
   (e) a load connected in series with said source and having an output current flow therethrough resulting from variations in said resistor and hence indicative of said condition,
   (f) a voltage regulator,
   (g) a pair of wires connecting said series-connected source and load through said regulator across both the output circuit of said amplifier and the input junctions of said bridge, whereby the operating voltage of said amplifier is stabilized despite variations in said output current flow through said load resulting from variations in the value of said resistor,
   (h) a feedback resistor connected in series with said load to produce a feedback voltage, and
   (i) means to feed said feedback voltage into the arm of said bridge containing said sensing resistor in series opposition to the voltage produced by the sensing resistor to rebalance the bridge, whereby the output current is accurately proportional to changes in said resistor.

2. A converter system as set forth in claim 1, further including a Zener diode connected across said input junctions to stabilize the voltage thereacross.

3. A system as set forth in claim 1, wherein said regulator is constituted by a transistor having its emitter and collector in series with one of said wires, a reference voltage being applied to the base of said transistor.

4. A system as set forth in claim 1, wherein said resistor is a temperature-responsive element, and said load is a read-out device to indicate the temperature sensed by said element.

5. A system as set forth in claim 4 wherein said resistor is wound with platinum wire.

6. A system as set forth in claim 4, wherein said resistor and amplifier are located in the field, whereas the load and D-C source are located at a remote instrument room.

References Cited

UNITED STATES PATENTS

| | | |
|---|---|---|
| 2,315,127 | 3/1943 | Mounce. |
| 2,974,303 | 3/1961 | Dixon. |
| 3,028,756 | 4/1962 | Takagishi. |
| 3,036,464 | 5/1962 | Beeston _____ 73—342 |
| 3,106,645 | 10/1963 | Kaufman. |
| 3,263,092 | 7/1966 | Knauss _____ 307—310 XR |

LOUIS R. PRINCE, Primary Examiner

FREDERICK SHOON, Assistant Examiner

U.S. Cl. X.R.

323—75; 340—186

Notice of Adverse Decisions in Interferences

In Interference No. 97,615 involving Patent No. 3,503,261, H. A. Riester and T. Kobayashi, RESISTANCE TO CURRENT CONVERTER, final judgment adverse to the patentees was rendered June 26, 1973, as to claims 1, 2, 3, 4, 5 and 6.

[*Official Gazette December 25, 1973.*]